Aug. 21, 1956     E. R. HERZOG     2,759,322
SEED AND FERTILIZER SPREADER APPARATUS
Filed Dec. 15, 1953     2 Sheets-Sheet 1
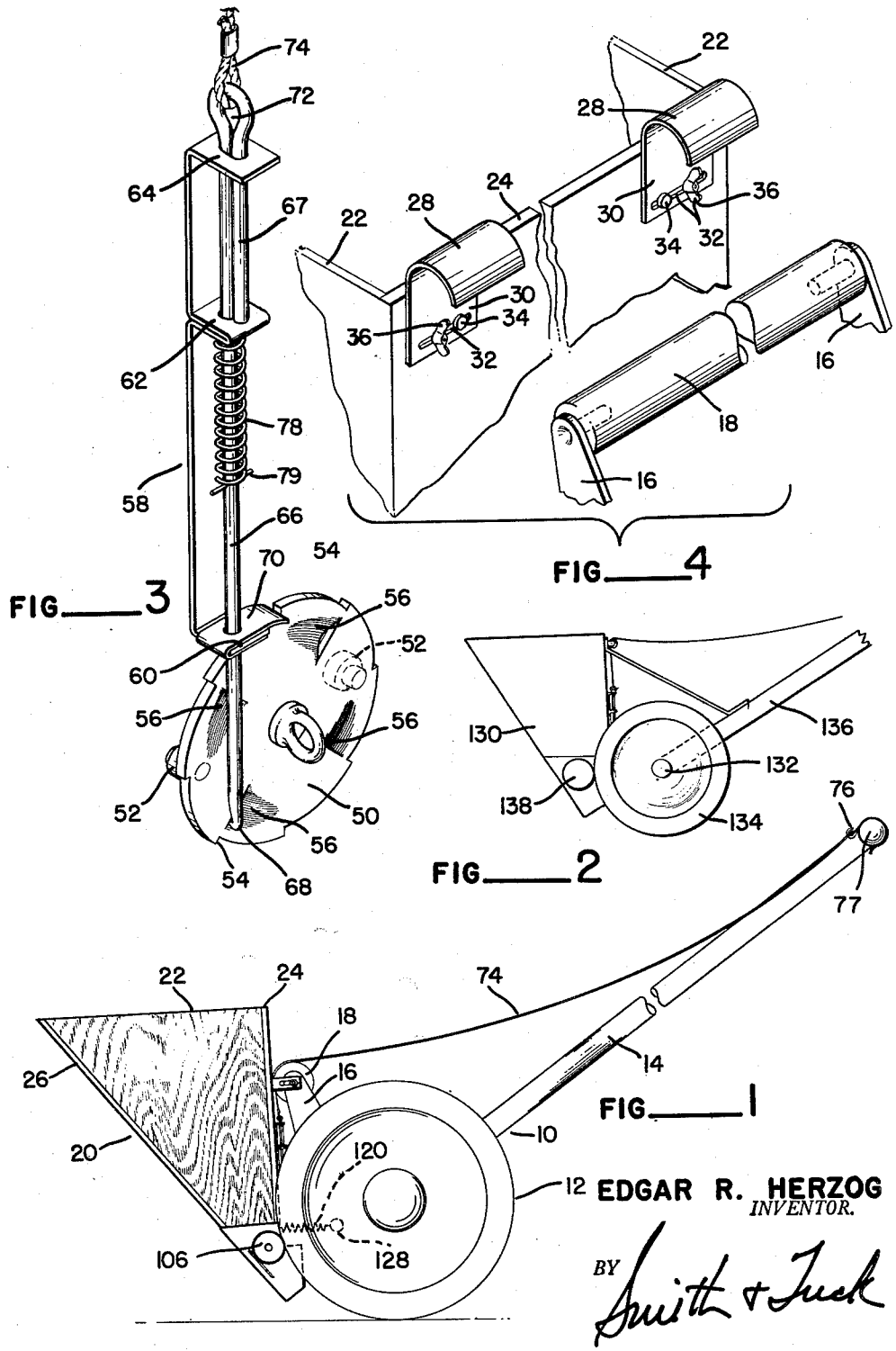
EDGAR R. HERZOG
INVENTOR.
BY Smith & Tuck

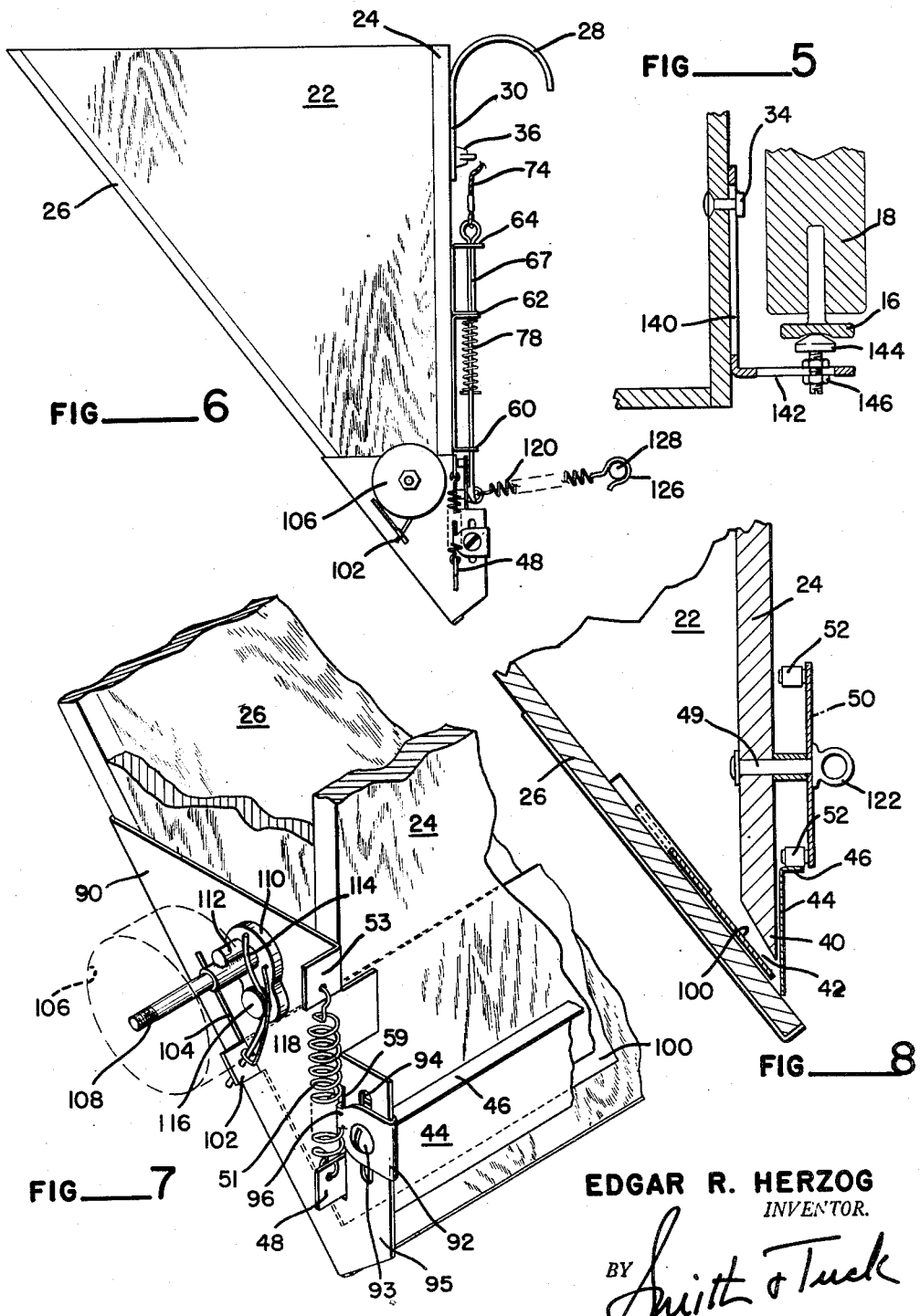

United States Patent Office 2,759,322
Patented Aug. 21, 1956

2,759,322

SEED AND FERTILIZER SPREADER APPARATUS

Edgar R. Herzog, Seattle, Wash.

Application December 15, 1953, Serial No. 398,277

7 Claims. (Cl. 56—249)

This invention relates to improvements in a seed and fertilizer spreader apparatus suitable for use on lawns and in home gardens, and more particularly relates to a spreader apparatus which is adaptable for use in connection with an overturned lawn mower of the type having a ground-engaging roller which, when the lawn mower is overturned, is disposed above the ground upward of the usual lawn mower wheels.

Since it is quite common that everyone who tends a lawn is the owner or operator of a lawn mower and since it is further advisable to periodically spread seed and fertilizer and sand and other discrete particle materials for the purposes of maintaining, enhancing, or feeding such a lawn, it appears to me unwise and unnecessary in many instances for the gardener to also possess spreading apparatus which has its own wheels, handle, and the other usual appurtenances. This is so because the lawn mower, when overturned, will make an excellent wheeled base and frame for the support of a spreader hopper. It is therefore an important object of this invention to provide a seed and fertilizer spreader apparatus which is adapted to be suspended from the frame and elements of an overturned lawn mower to the end that the latter serves a dual purpose and so as to avoid the necessity of providing in such spreader its own wheels, handle, and the like.

It is common with currently available spreader devices to drive an agitator mechanism within the hopper for the discrete materials to be spread which is directly associated with the usual ground-engaging and supporting wheels in such a manner that agitation is had to aid the movement of the discrete particles through the distributing orifices of the spreader device. However in connection with adapting a spreader hopper to an overturned lawn mower, it is necessary that agitation of the materials, to urge and direct them through the distributing orifices, be of a frictional-drive nature wherein power is taken from the surface of the ground-engaging wheels of the lawn mower and transmitted to the particle-agitating means. This I have found from my previous work presents certain rather serious difficulties because most agitating mechanisms do not normally lend themselves to operation by friction drive means. It has therefore become and been another object of this invention to provide an improved and novel agitating mechanism operable upon discrete particles within the hopper which can be caused to adequately function for the intended purpose by such limited rotative power as is attainable through a friction drive between the ground-engaging wheels and a rotatable actuator wheel carried by the feeder hopper.

A further object of this invention resides in the provision of a novel and simple gate means and actuation means therefor which may be controlled in its effectiveness by the operator from a remote point very simply and quickly; and which mechanism also is easy to construct and install to the end that low costs are maintained and as wide a market as possible may be reached.

These objects as well as other objects which may be more apparent form the text of the following specification in which is set forth certain preferred forms of the invention, as well as alternatives thereto in one or two instances, and which relates to the accompanying drawings forming a part of this specification wherein like parts are indicated by like reference numbers throughout the drawings.

In the drawings:

Figure 1 is a view in side elevation showing a lawn mower overturned and having mounted thereon a spreader apparatus according to my invention;

Figure 2 is a side view in reduced scale disclosing a spreader apparatus according to my invention but in this instance, alternatively to that shown in Figure 1, the apparatus also includes its own ground-engaging wheels, handle, brace means and the like;

Figure 3 is an enlarged view in perspective of an indexing type gate-actuating mechanism for the control of particle distribution from the spreader hopper;

Figure 4 is an enlarged fragmentary exploded perspective view showing the details of construction whereby the spreader hopper is attachable in suspended manner upon the usual ground-engaging roller of an overturned lawn mower;

Figure 5 is a fragmentary view showing an alternative manner of joining the hopper to the lawn mower ground roller;

Figure 6 is an enlarged end view of the spreader apparatus of Figure 1;

Figure 7 is an enlarged fragmentary view in perspective of a lower corner of the generally wedge-shaped hopper employed in my apparatus; and Figure 8 is an enlarged view in vertical cross section of a lower fragment of the pointed end of the spreader hopper taken medially of the hopper.

Referring now to Figure 1, in which is to be seen the preferred form of the invention, it will be noted that the numeral 10 designates as a whole a lawn mower which is here shown in its overturned position. This lawn mower consists of a pair of ground-engaging wheels 12, mounted on opposite sides of a frame (not shown in this instance) which carries the usual cutter reel and which has the handle 14. The frame includes an outstanding horn 16 at each end of the space between wheels 12 of the lawn mower and a ground roller 18 is mounted for rotation between the horns 16, 16 in the usual manner.

The hopper 20 comprises a pair of ends 22 which are triangular in shape and which with the rear wall 24 and a front wall 26 assume the form of a wedge or prism. The hopper, by being open at the top, readily receives seed and fertilizer and other particle materials for spreading. On the rear face of the wall 24 I provide a pair of hooks 28 of a size to engage over roller 18 so that the hopper may be suspended on the overturned lawn mower 10. The length of such rollers 18 varies and for that reason the lower portion 30 of the hooks 28 is slotted at 32 and a pair of clamping bolts 34 and 36 pass through the slot and are anchored to the hopper wall 24 whereby lateral adjustment of the hooks 28 may be obtained.

For the purposes of keeping the cost low of such a device, I have found it preferable to form the hopper walls 22, 24, and 26 of relatively thin weight waterproof plywood which readily lends itself to cutting and joining in the well-known manner. It will of course be apparent to those skilled in the art that the hopper could very well be formed of sheet metal.

As shown in Figure 8, the front wall 24 of the hopper terminates at its lower edge with a tapered and pointed lip 40, located in spaced relation to the lower edge of the wall 26 which underlies wall 24. A slit orifice 42 is thus provided extending the full length of the hopper 20 between the walls 22.

Orifice 42 is less restricted inwardly than it is at the point, where discrete material leaves the hopper, due to the tapered, throat-like construction or shape obtained by the manner in which the pointed end 40 is formed with relation to the slope of wall 26.

A gate 44 is outwardly mounted adjacent the orifice 42 for vertical movement into and out of the path of material passing through the orifice. This controls the spreading operation. Gate 42 has an upper flange 46 and ears 48 one at each end. Mounted on the wall 24 above the flange 46 of the gate 44 is a pivot pin 49 which rotatably supports the disc 50 that carries on its rear surfaces a pair of rollers 52, 52 located diametrically opposite each other. The disc 50 has a plurality of unidirectional teeth 54 about its periphery. Also it is provided on its face with four identical toothed-edge recesses 56. Mounted on the wall 24 is a clip 58 having several outstanding tabs 60, 62 and 64 in which is mounted for reciprocal sliding movement the indexing rod 66 that has a hook 68 at its lower end. Hook 68 engages with the toothed recesses 56 for rotatably indexing disc 50. Tab 60 has associated therewith a downturned, spring-pressed latch 70 which engages the teeth 54 of disc 50 and prevents reverse and undesirable rotation. By means of an eye 72 on the upper end of the rod 70, a pulling line 74 may be attached and, as shown in Figure 1, extended to a point where a hook 76 anchors the line to the cross handle 77 of the lawn mower handle 14. A return spring 78 is coiled about the shank of pin 66 and is seated on one end against cross pin 79 and has its other end pressing the underside of tab 62. The rotation of the pin 66, which would result in the disengagement or dislocation of the hook end 68 from a position where it may engage the lips of recesses 56, is prevented by a return bend 67 of the upper end of the shank which passes the same downward through tab 64 and tab 62 as shown in Figure 3. The return bend portion 67 does not extend through the tab 62 but comes into abutment against the upper surface of the tab 62 and thereby forms a stop precluding unlimited downward movement of the pin 66.

To facilitate the mounting of the mechanical elements whereby actuation is obtained in this device, I provide a triangular end plate 90 on each of the lower corners of the end walls 22. Such plate 90 is slit at 59 and the tab 48 on the gate 44 passes through such slit. A spring 51 biases the gate 44 upward in slit 59 and has its other end anchored to a second tab 53 which outstands as a part of the plate 90. Upward movement of the gate 44 is controlled by the setting of an adjustable stop clip 92 which is secured in position by means of a screw fastening 93 inserted through a slot 94 in the outstanding tab 95 of the plate 90. A tongue 96 on the inward end of clip 92 is also engaged in the slot 59 and the tab 48 of gate 44 will strike this tongue when it is pulled upward due to the action of spring 51.

Downward movement of the gate 44 is produced when one of the rollers 52 comes into contact with the flange 46 of the gate. Gate 44 contacts the upper surface of the wall 26 and effectively closes the orifice 42. When the operator desires to permit the raising of the gate he imparts a pull on line 74 causing hook 68 which is engaged in one of the recesses 56 to pull upward and, in a clockwise manner, to revolve disc 50. In that instance the rollers 52, from being vertically disposed with relation to each other, are now horizontally disposed as shown in Figure 3 and the gate rises under the action of the biasing spring 51. Release of the pulling force upon the line 74 will of course permit the indexing rod 66 to return downward at which position it engages the next following recess and its lip 56. Thus, when the operator wants to close the gate 44, all he need do is to again impart a pull upon line 74 whereupon the rollers contact flange 46, revolve to the vertical relationship of Figure 8, and one of them presses upon flange 46 and forces the gate downward. This very desirable feature of my indexing mechanism means that at all times, whether to start or to stop a flow of material through the orifice 42, the operator imparts force in the same direction without the use of levers, bell cranks, or any of the other or more complicated arrangements of current gate-operating devices.

As was stated above, it is desirable that the mechanism which agitates the discrete particles within the hopper and aids in urging them through the orifice 42 must be of a simple construction and easy to operate since I have found it preferable in accomplishing the object of this invention to actuate such a means through friction-driving arrangements. The agitating means comprises the shuttle plate 100 which lies partially in the orifice 42 and overlies the inner surface of the wall 26 of the hopper. Plate 100 extends from end to end interiorly of the hopper and has on its upper corners outstanding tabs 102 which pass through slit 104 in the end wall of the hopper and of plate 90. Up and down reciprocal motion of plate 100 along the inclined wall 26 accomplishes a shuttling agitation of the particle materials overlying the plate and filling the entrance to the orifice 42. This up and down agitation of plate 100 in a quite accurately measured manner feeds material through the orifice. It must be understood, and this is particularly true with feeding seeds such as lawn grass seed, that it requires a high degree of control in the feeding operation which accomplishes a very steady but light weight flow to the end that uniform seeding and uniform fertilization with dry material can be obtained.

The reciprocating motion described for feed plate 100 is had through the use of an actuator wheel 106 coupled to shaft 108 which rotates with it and which is mounted in a journal plate 110 as may be clearly seen in Figure 7. Between the wheel 106 and journal plate 110 shaft 108 is provided with an outstanding camming boss 112 which turns with the shaft. A rock lever 114 mounted on pin 116 to one side of the location of shaft 108 has an end which rides upon the cam element 112 and another end which passes through an opening in tab 102. Rotation of wheel 106 accomplishes rotation of the shaft 108 which causes the cam surface 112 to periodically dispose itself under the rock lever 114 causing the rock lever to swing about its pivotal axis and the other end to raise and then lower the shuttle plate 100 out and in the mouth of the orifice 42. A biasing spring 118 anchored at one end to the journal plate 110 and at the other end to the rock lever 114 takes up slack and insures that the cam following end of the rock lever is constantly bearing upon shaft 108 or its camming portion 112. Also the spring 118 tends to urge the shuttle plate downward so that its tab 102 is normally at or near the lower end of slot 104. A spring 120 between the eye 122 of shaft 48 and a hook 126 which may be engaged over a rod 128 that is part of the lawn mower frame tends to pull upon the hopper and to cause the wheels 106 to rather tightly and frictionally engage them to the outer tread surface of wheels 12 of the overturned lawn mower. Spring 120 also imparts sufficient downward pull upon the hopper in addition to its normal weight and load to insure that even in an empty condition the hopper may not bounce off and become dislodged from the roller 18.

In the alternative form of the invention shown in Figure 2, the hopper 130 is mounted upon a frame which includes the axle 132 of wheels 134, the shaft 136 of the pusher bar for the vehicle, and the actuator wheel 138 in contact with the surface of wheels 134. A similar gate-operating mechanism is employed and also is to be found, while not here shown in detail, in the previously described shuttle plate 100 for the same purpose.

In certain types of lawn mowers rather than engage hooks 28 of the hopper over a roller 18 I have found it preferable to use the laterally adjustable L-shaped clips 140 shown in Figure 5 in lieu of the over-hooked clips 30 of Figure 4. In the outstanding leg 142 of such a clip I provide an adjustable center point 144 having a threaded shank and secured in place by lock nuts 146. By means of this arrangement a quick and simple attachment of the hopper to the frame of the overturned lawn mower is possible but also it will be noted that the hopper can be somewhat longer than the roller which is not particularly the case where a hopper is suspended by hooks passing over the roller 18.

It will be apparent to those who have carefully studied and become acquainted with the subject matter of this invention that the objects set forth in this specification have been attained and that such is possible with a simple, very easily constructed mechanism that may, with considerable rapidity, be brought into operative use either as a self-contained unit or as an apparatus adapted for suspension from a conventional lawn mower. It should also be noted that the construction and operation of the various important parts of the device are of the utmost simplicity to such a degree that the apparatus may be employed effectively even by the most unskilled persons in the mechanical field.

While I have shown and described herein certain preferred and alternative forms of the invention, it will of course be understood that it is my intention to not only cover the specific invention but such changes and alterations as would occur to the skilled mechanic which woud come within the spirit and scope of the subjoined claims.

Having thus described my invention, I claim:

1. A seed and fertilizer spreader apparatus for use in connection with an overturned lawn mower of the type having a ground-engaging roller which is then disposed above the ground upward of the usual lawn mower wheels, said apparatus comprising: wall means forming a generally wedge-shaped hopper including hook means on the rear thereof whereby said hopper may be suspended from such roller with its lower edge closely proximate the ground surface and below the upper portions of the mower wheels, an actuator wheel on each end of the hopper disposed for surface engaging relation to the leading faces of the lawn mower wheels for rotation upon wheeling movement of the lawn mower, means forming an elongated discharge slit-orifice in the lower edge of the hopper, valve means for said slit-orifice, a reciprocal feed plate in said hopper operatively related along one edge to said slit-orifice and extending thereabove, inwardly of the valve means to urge discrete materials in contact therewith outward from said hopper through said slit-orifice, and oscillator means activated by rotation of said actuator wheels to impart such reciprocal movement to said feed plate.

2. The structure according to claim 1 in which there is included resilient means for attachment between said hopper and the lawn mower frame to draw the actuator wheel into close frictional engagement with the lawn mower wheels.

3. The structure according to claim 1 in which the oscillator means actuated by rotation of said actuator wheels for reciprocating said plate comprises a cam turned by an actuator wheel and a rockable lever operatively associated with said cam and operable upon said plate.

4. The structure according to claim 1 in which the valve means for the slit-orifice comprises an upwardly biased gate having a lip disposed at the adit of said orifice and indexible cam means is included to press upon or release said gate.

5. A seed and fertilizer spreader apparatus, comprising: a pair of ground-engaging wheels including an axle and pusher handle to advance the same over the ground, a generally wedge-shaped hopper supported between said ground-engaging wheels in advance thereof with its lower edge closely proximate the ground surface and below the upper portions of said wheels, an actuator wheel on each end of the hopper in surface engaging relation to the leading face of the adjacent ground-engaging wheels for rotation thereby, means forming an elongated slit-orifice in the lower edge of said hopper, valve means for said slit-orifice, a reciprocal feed plate in said hopper operatively related along one edge to said slit-orifice and extending thereabove inwardly of the valve means to urge discrete materials outward from said hopper through said slit-orifice, and oscillator means actuated by said actuator wheels to impart such reciprocal movement to said feed plate.

6. The structure according to claim 5 in which the oscillator means actuated by rotation of said actuator wheels for reciprocating said plate comprises a cam turned by an actuator wheel and a rockable lever operatively associated with said cam and operable upon said plate.

7. The structure according to claim 5 in which the valve means for the slit-orifice comprises an upwardly biased gate having a lip disposed at the adit of said orifice and indexible cam means is included to press upon or release said gate.

References Cited in the file of this patent

UNITED STATES PATENTS

| | | |
|---|---|---|
| 1,829,627 | Bamford et al. | Oct. 27, 1931 |
| 1,876,409 | Gordon | Sept. 6, 1932 |
| 2,242,710 | Loomis | May 20, 1941 |
| 2,639,571 | Kelly | May 26, 1953 |